C. S. ROBINSON.
REACTION TOWER.
APPLICATION FILED JUNE 16, 1917.
1,257,400.
Patented Feb. 26, 1918.
2 SHEETS—SHEET 1.
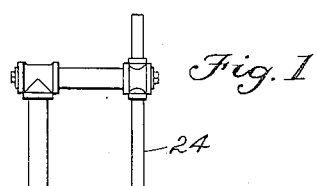
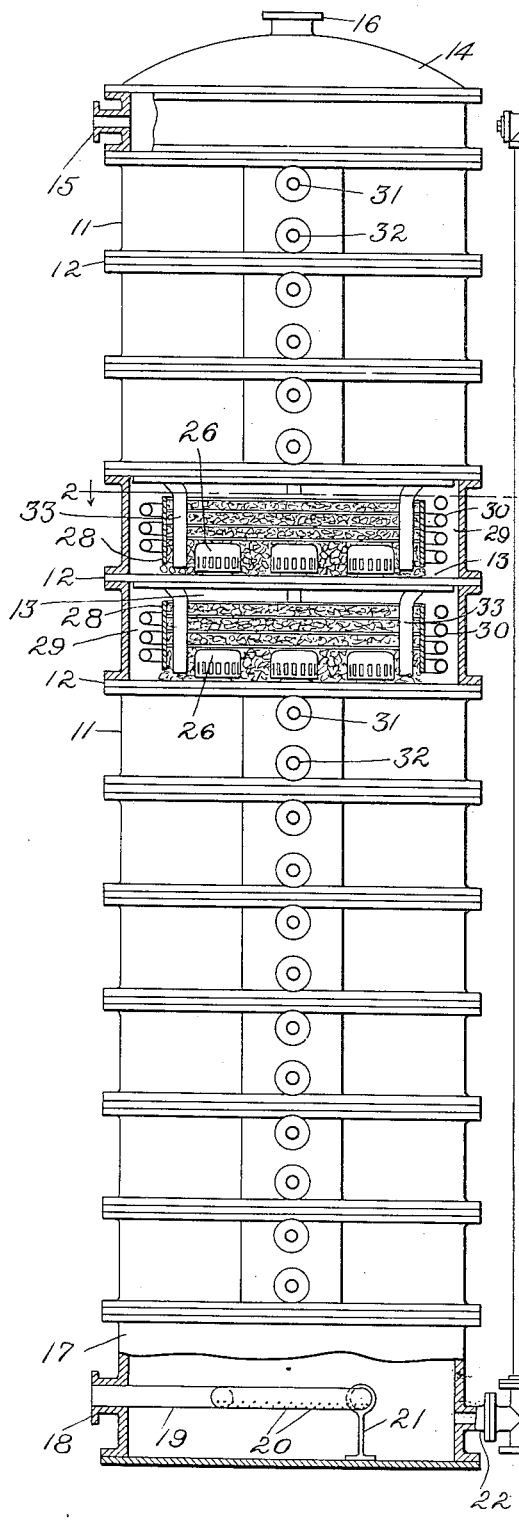
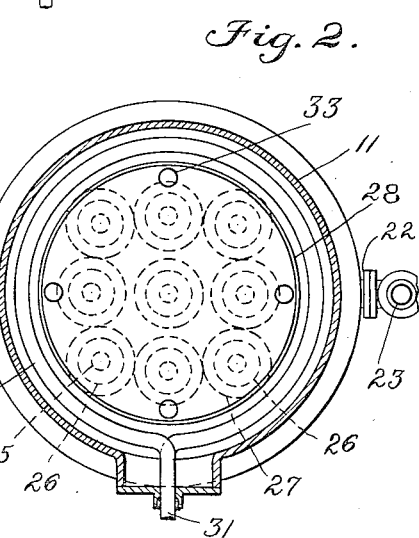
Inventor
Clark S. Robinson
by Wright, Brown, Quinby & Ray
Attorneys

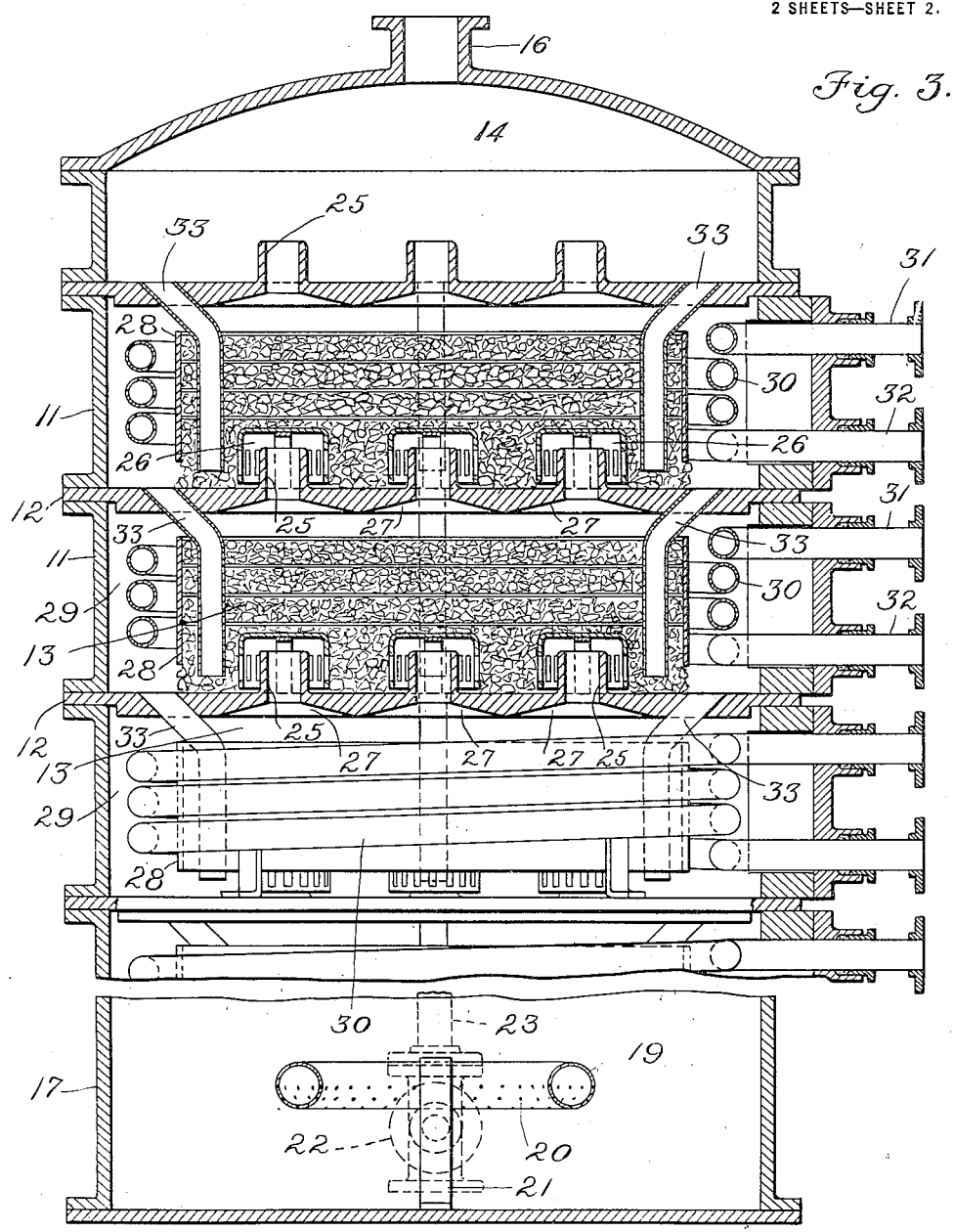

UNITED STATES PATENT OFFICE.

CLARK S. ROBINSON, OF CAMBRIDGE, MASSACHUSETTS, ASSIGNOR TO E. B. BADGER AND SONS COMPANY, OF BOSTON, MASSACHUSETTS, A CORPORATION OF MASSACHUSETTS.

REACTION-TOWER.

1,257,400. Specification of Letters Patent. Patented Feb. 26, 1918.

Application filed June 16, 1917. Serial No. 175,128.

*To all whom it may concern:*

Be it known that I, CLARK S. ROBINSON, a citizen of the United States, residing at Cambridge, in the county of Middlesex and State of Massachusetts, have invented new and useful Improvements in Reaction-Towers, of which the following is a specification.

The present invention relates to apparatus in the nature of reaction towers wherein the reaction is caused to take place between a liquid and a gas by causing gas to rise through a body of liquid in the tower and by causing the liquid to flow downward from the top to the bottom of the tower, from which latter point it is withdrawn. The essential parts of a reaction tower are a series of chambers placed one above another, with means for admitting liquid to an upper chamber of the series, means for admitting gas to a lower chamber of the series, and conducting means between successive chambers of the series designed and arranged to permit flow downwardly of liquid from one to another, and upward passage of gas from one chamber to another. The term "tower" as used in the following specification and claims is to be understood in the light of this definition and is intended to include not only structures in which the chambers are directly superposed, with common partition plates forming the bottom of one chamber and the top of the one below, but also any other form of apparatus having chambers and conducting means having the essentials above set forth, whatever may be the precise construction and arrangement of such essential parts.

More particularly the invention has reference to apparatus adapted to carry on reactions in the course of which heat is evolved and the specific gravity of the liquid is increased as the result of the reaction. The particular objects of the invention therefore is to provide a means by which to maintain the temperature of the liquid below the maximum allowable temperature, by constantly withdrawing heat and by circulating the liquid in contact with the cooling means in a sufficiently rapid manner to distribute the cooling effect substantially uniformly throughout the entire mass of liquid; to accomplish the foregoing effect in connection with a perfect counter-current action between the liquid and gas and with maintenance of the chambers of the tower full of liquid; and to provide means for effecting thorough distribution of the gas throughout the liquid undergoing reaction.

I have applied the invention specifically to the use of chlorinating hydrocarbons, such as benzol in order to produce monochlorbenzol; but as the invention relates to an improvement in apparatus, I do not restrict the same to this particular use, but claim as my invention the apparatus pointed out in the appended claims for any use to which the same may be applicable. The reaction between benzol and chlorin gas, however, evolves heat and the liquid becomes heavier as the result of the reaction. If the temperature of the liquid undergoing reaction becomes higher than a certain degree, the product di-chlorbenzol is produced and it is therefore necessary to keep the temperature below the point indicated in order to insure production of the desired mono-chlorbenzol.

The precise nature of the invention appears from the following description of one embodiment thereof, in connection with the drawings forming a part thereof, in which—

Figure 1 is a front elevation with a part broken away to show the interior of such tower.

Fig. 2 is a cross section on line 2—2 of Fig. 1 and a plan view of the parts below said line.

Fig. 3 is a vertical section on an enlarged scale of portions of the tower.

The same reference characters indicate the same parts in all the figures.

The embodiment of the invention here shown comprises a tower made in sections, each section being a cylindrical shell 11, superposed upon the shell below, partition plates 12 being interposed between these shell sections. Thus the tower is divided into a superposed series of reaction chambers 13.

In the uppermost chamber 14 of the tower above the reaction chambers there is a nipple 15 to which may be attached a pipe for conducting the liquid, such as benzol, or any other hydrocarbon or other liquid to be acted upon, to the tower, said nipple 15 being thus the liquid inlet. There is another nipple 16 in the top of the chamber 14 from which exhaust gas is withdrawn, such nipple being the gas outlet of the tower. In the bottom section or chamber 17 there is a gas inlet nipple 18 to which a gas conduit may be connected and from which a distributing pipe 19 leads to the interior of the chamber. This pipe is bent into ring form and is provided with orifices 20 in its under side for emission of the gas. 21 represents a supporting bracket for the distributing pipe 19. Another nipple 22 in the wall of chamber 17 provides the outlet for the liquid resulting from the reaction and to this outlet is connected a draw-off pipe 23 which rises to substantially the height of the inlet chamber 14, and is at that height connected to a pipe 24 which leads to the point from which the finished liquid is taken. The rising draw-off pipe 23 provides a liquid seal which insures that the tower will be kept substantially full of liquid.

In each of the reaction chambers are gas-conveying tubes 25 which rise from the partition plate forming the bottom of that chamber and open into the chamber below, and over the outlets of these tubes are placed distributing caps 26 each of which incloses one of the tubes 25 and an intermediate space through which the gas may freely flow. These caps are provided to distribute the gas as uniformly as practicable to the mass of liquid in the chamber, and are or may be essentially similar to the boiling caps commonly used in distilling apparatus.

A feature to which I would call particular attention is that in the under side of each of the partition plates are cavities 27 leading to the several conveying tubes, the highest points of these cavities being at the inlets of the tubes. In other words these cavities rise from the surface of the partition which forms the top of the reaction chamber below. The purpose and effect of these cavities is to distribute the gas rising through each chamber equally to all of the conducting tubes leading to the chamber next above. As it is practically an impossibility to install the tower so that the partitions are absolutely level, and as the chambers are all completely filled with the liquid, the gas would pass exclusively through the conveying tube at the highest level, or at most through a few of the tubes rather than all of them, if it were not for these cavities.

Preferably the gas-conveying tubes and caps are located in the central part of the chamber, and are all at some distance from the shell of the tower. An annular wall of partition 28 surrounds the space into which said conveying means opens and divides this space from an outer annular space 29 in which is located a cooling coil 30 for conducting a cooling fluid. The terminals 31 and 32 of this coil pass through the wall of the chamber, in which they are properly packed and are adapted to be connected with headers or other conducting means for supplying the fresh cooling fluid and withdrawing the exhausted fluid.

The annular partition 28 is supported above the bottom of the chamber and its upper edge is below the top of the chamber, constituting thus an open tube into the bottom of which liquid may freely flow and from the top of which the liquid may freely pass. Preferably, however, the edges of this partition are respectively below and above the top and bottom of the cooling coil as shown. It is to be understood that any mechanically suitable supporting means may be used for holding the partition and coil in substantially the relation shown. The space within the annular partition and around the transferring caps may be filled with broken pumice, or other material for the purpose of effecting an intimate mingling of the liquid and gas. Such material is indicated in Figs. 1 and 3.

The means for transferring liquid downward from chamber to chamber is shown as comprising pipes 33 passing through the transverse partitions 12 from points outside of the annular wall 28 of the chamber above into the space within the annular wall 28 of the chamber below. The number of such pipes indicated in the drawings is four, but there may be more or fewer as desired.

It is to be understood that each of the reaction chambers is provided with the gas-conveying tubes and caps, the cooling coil, the annular partition, and the liquid-transferring pipes, although only two of the chambers are shown in Fig. 1 as being thus equipped.

It will be understood from the foregoing description that gas is continually admitted at the bottom of the tower and rises through the same from chamber to chamber, being distributed and mingled with the liquid in each chamber as above described; that the liquid product of the reaction is withdrawn, either continuously or intermittently, the rate of withdrawal being limited by the capacity of the outlet 22, which is less than the combined capacities of the transfer pipes 33, and that liquid to be acted upon by the gas is admitted through the inlet 15 in sufficient quantities to make good the withdrawal. All the chambers are kept full of the liquid, and there is a perfect counter-current effect between the flow of the liquid and the gas, respectively.

In each separate chamber a circulation of the liquid undergoing reaction past the cooling coil takes place continuously, and thereby the cooling effect of such coil is distributed uniformly throughout the entire body of liquid in the chamber. This circulation takes place upwardly within the annular partition wall and downwardly in the space outside thereof and is effected by the joint action of three causes; first, the convection action of the upwardly flowing particles of gas within the annular chamber, second the thermal action due to heating the liquid within the annular partition and cooling the liquid outside of said partition, making the liquid outside more dense than that inside, and third, the displacement of the liquid within the annular chamber by the lighter liquid from the chamber above, which is conducted to the lower part of the space inclosed by the annular partition of the chamber below. Since the liquid increases in specific gravity by the reaction, the liquid contained in each lower chamber is heavier than the liquid in the chambers above, wherein the reaction has not progressed so far. The circulation caused by these forces is entirely independent of the rate of flow of the entire body of liquid through the tower and is ordinarily many times greater than such rate of flow. It is governed by the reaction itself and by the temperature of the cooling fluid in the coils and is regulated, in part automatically, to maintain the temperature within the required limits, whether the flow through the tower is fast or slow.

For the production of this circulation effect it is essential that there should be a partition sub-dividing each chamber into two portions, in one of which the reaction mainly takes place, and in the other of which the cooling of the liquid takes place, such portions being conveniently called the reaction portion and the cooling portion; and that the partition should be open so that free flow may take place between these portions at different levels. It is possible to vary the form and position of the partition and to vary the character, form, and position of the cooling means, from those shown in the drawings, and I therefore do not limit the invention to the details thus shown, but include within the invention any apparatus having the essentials last pointed out.

What I claim and desire to secure by Letters Patent is:

1. An apparatus for effecting reaction between a liquid and a gas, in the course of which heat is evolved and the specific gravity of the liquid is increased, comprising a series of reaction chambers one above another, means for admitting liquid to the uppermost chamber of said series, means for transferring liquid from each upper chamber of the series to the one next below, an inlet for the gas to the lowermost chamber of the series, means for conveying gas from each lower chamber of the series to the one next above, means for drawing off liquid from the lowermost of said chambers, means for cooling and means for causing local circulation of, the liquid undergoing reaction in the several chambers.

2. A reaction chamber as set forth in claim 1 in which the cooling means is in a portion of the chamber out of vertical alinement with that portion into which the gas conveying means discharge, the circulation-causing means comprises a substantially upright partition having openings at different levels through which liquid may freely flow from one of said portions to the other.

3. A reaction apparatus as set forth in claim 1 wherein the liquid circulating means comprises an upright tubular partition within the chamber open at its top and bottom to permit free flow between its interior and the surrounding space at different levels, into which the gas-conducting means discharge, the cooling means being outside of said shell.

4. A reaction apparatus as set forth in claim 1 having as the means for drawing off the liquid an eduction pipe rising to approximately the height of the uppermost chamber of the series to provide a seal keeping the chambers full of liquid.

5. A reaction apparatus as set forth in claims 1 and 3, in which the cooling means is a pipe coil surrounding the partition and containing a circulating fluid.

6. A reaction apparatus according to claims 1 and 3 in which the said fluid transferring means leads from the space in an upper chamber outside of the partition therein to the space within the partition in the lower chamber.

7. A reaction apparatus as set forth in claim 1 wherein the top walls of the lower reaction chambers have recesses in their underneath surfaces, from the upper limits of which the gas-conveying means lead to the chambers respectively above.

8. A reaction apparatus according to claim 1 in which the gas-conveying means are tubes passing from the top of one chamber to the bottom of the chamber next above, and caps surrounding the outlets of said tubes.

In testimony whereof I have affixed my signature.

CLARK S. ROBINSON.